(12) United States Patent
Bakdash et al.

(10) Patent No.: US 8,947,432 B2
(45) Date of Patent: *Feb. 3, 2015

(54) ACCELERATED RENDERING WITH TEMPORALLY INTERLEAVED DETAILS

(71) Applicant: NVIDIA Corporation, Santa Clara, CA (US)

(72) Inventors: Jonathan Bakdash, Perryville, MD (US); Qi Mo, Santa Clara, CA (US); David Luebke, Charlottesville, VA (US); Douglas A. Voorhies, Menlo Park, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/657,744

(22) Filed: Oct. 22, 2012

(65) Prior Publication Data

US 2013/0113803 A1      May 9, 2013

Related U.S. Application Data

(63) Continuation of application No. 12/493,101, filed on Jun. 26, 2009, now Pat. No. 8,294,714.

(51) Int. Cl.
*G06T 15/00* (2011.01)
*G09G 5/36* (2006.01)

(52) U.S. Cl.
CPC .............. *G06T 15/00* (2013.01); *G06T 15/005* (2013.01); *G06T 2210/52* (2013.01); *G09G 5/363* (2013.01); *G09G 2340/0407* (2013.01); *G09G 2360/08* (2013.01)
USPC ........... 345/428; 345/419; 345/660; 345/669; 345/670

(58) Field of Classification Search
CPC ................................ G06T 15/00; G06T 15/05
USPC .................. 345/419, 428, 660, 667, 669, 670
See application file for complete search history.

(56) References Cited

U.S. PATENT DOCUMENTS

| 7,034,819 | B2* | 4/2006 | Lee et al. | 345/419 |
|---|---|---|---|---|
| 7,952,748 | B2* | 5/2011 | Voltz et al. | 358/1.2 |
| 7,957,611 | B2* | 6/2011 | Zhu et al. | 382/300 |
| 7,982,740 | B2* | 7/2011 | Tang et al. | 345/501 |
| 7,995,045 | B2* | 8/2011 | Dunki-Jacobs | 345/204 |
| 8,130,227 | B2* | 3/2012 | Johnson et al. | 345/501 |
| 8,159,606 | B2* | 4/2012 | Sole et al. | 348/441 |
| 8,199,154 | B2* | 6/2012 | Tang et al. | 345/501 |
| 8,410,994 | B1* | 4/2013 | Testa et al. | 345/1.3 |
| 8,441,474 | B2* | 5/2013 | Nedeljkovic et al. | 345/418 |

* cited by examiner

*Primary Examiner* — Phu K Nguyen
(74) *Attorney, Agent, or Firm* — Patterson & Sheridan, LLP (57) ABSTRACT

One embodiment of the invention sets forth a mechanism for interleaving consecutive display frames rendered at complementary reduced resolutions. The GPU driver configures a command stream associated with a frame received from a graphics application for reduced frame rendering. The command stream specifies a nominal resolution at which the frame should be rendered. The reduced resolution associated with the frame is determined based on the reduced resolution of an immediately preceding frame (i.e., the complementary reduced resolution), if one exists, or on GPU configuration information. The GPU driver then modifies the command stream to specify the reduced resolution. The GPU driver also inserts an upscale command sequence specifying the nominal resolution into the command stream. Once the command stream is configured in such a manner, the GPU driver transmits the command stream to the GPU for reduced rendering.

18 Claims, 6 Drawing Sheets

ACCELERATED RENDERING WITH TEMPORALLY INTERLEAVED DETAILS

CROSS-REFERENCE TO RELATED APPLICATIONS

This application is a continuation of co-pending U.S. Pat. No. 8,294,714 entitled "ACCELERATED RENDERING WITH TEMPORARILY INTERLEAVED DETAILS", Ser. No. 12/493,101, filed Jun. 26, 2009, hereby incorporated herein by reference.

BACKGROUND OF THE INVENTION

1. Field of the Invention

The present invention relates generally to the field of graphics processing, more specifically, to accelerated rendering with temporally interleaved details.

2. Description of the Related Art

A graphics processing unit (GPU) is a specialized processor that is configured to efficiently process complex graphics and other numerical computations. In typical computing systems, graphics processing and other computationally-intensive operations are off-loaded by the central processing unit (CPU) to the GPU. One task usually offloaded to the GPU is graphics rendering, where the GPU processes a frame of graphics data to render a display image that may then be displayed on a display device.

When performing graphics rendering operations, the computational load on the GPU is often proportional to the resolution, i.e. the number of distinct pixels in each dimension, at which the display image is rendered. For example, rendering a display image having a resolution of 1280×1024 pixels is substantially more computationally expensive than rendering a display image having a resolution of 800×600 pixels. In addition, the computational load of the GPU is also proportional to the frequency at which graphics rendering operations occur. For example, rendering display images for a display device having a display frequency of 120 Hz (120 frames/second) is substantially more computationally expensive than rendering display images for a display device having a display frequency of 60 Hz (60 frames/second). As the foregoing illustrates, as the demand for rendering display images at higher resolutions and/or at higher display frequencies increases, the computational loads on the GPUs increase as well.

A consequence of increasing the computational load on a GPU with respect to rendering operations is that a larger number of GPU cycles are continuously consumed by those operations. The GPU is thus not able to effectively perform other graphics or offloaded numerical computations. Further, in some instances, because of a lack of computational power, the GPU may not be able to support high-resolution processing or a high display frequency.

As the foregoing illustrates, what is needed in the art is a mechanism that allows graphics data to be rendered more effectively at high resolutions and high display frequencies.

SUMMARY OF THE INVENTION

One embodiment of the present invention sets forth a method for configuring a graphics rendering command stream to implement reduced frame rendering. The method includes the steps of receiving a first graphics rendering command stream associated with a first frame of graphics data, specifying a nominal resolution at which the first frame is to be rendered, determining a reduced resolution for the first frame based on configuration information associated with a graphics processing unit, and indicating to the graphics processing unit that the first frame is to be rendered at the reduced resolution and then upscaled to the nominal resolution.

One advantage of the disclosed method is that rendering complementary reduced resolution frames in conjunction with interleaving the display frames corresponding to the complementary reduced resolution frames can lower the computational load on the GPU while maintaining the perceived image quality of the display.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
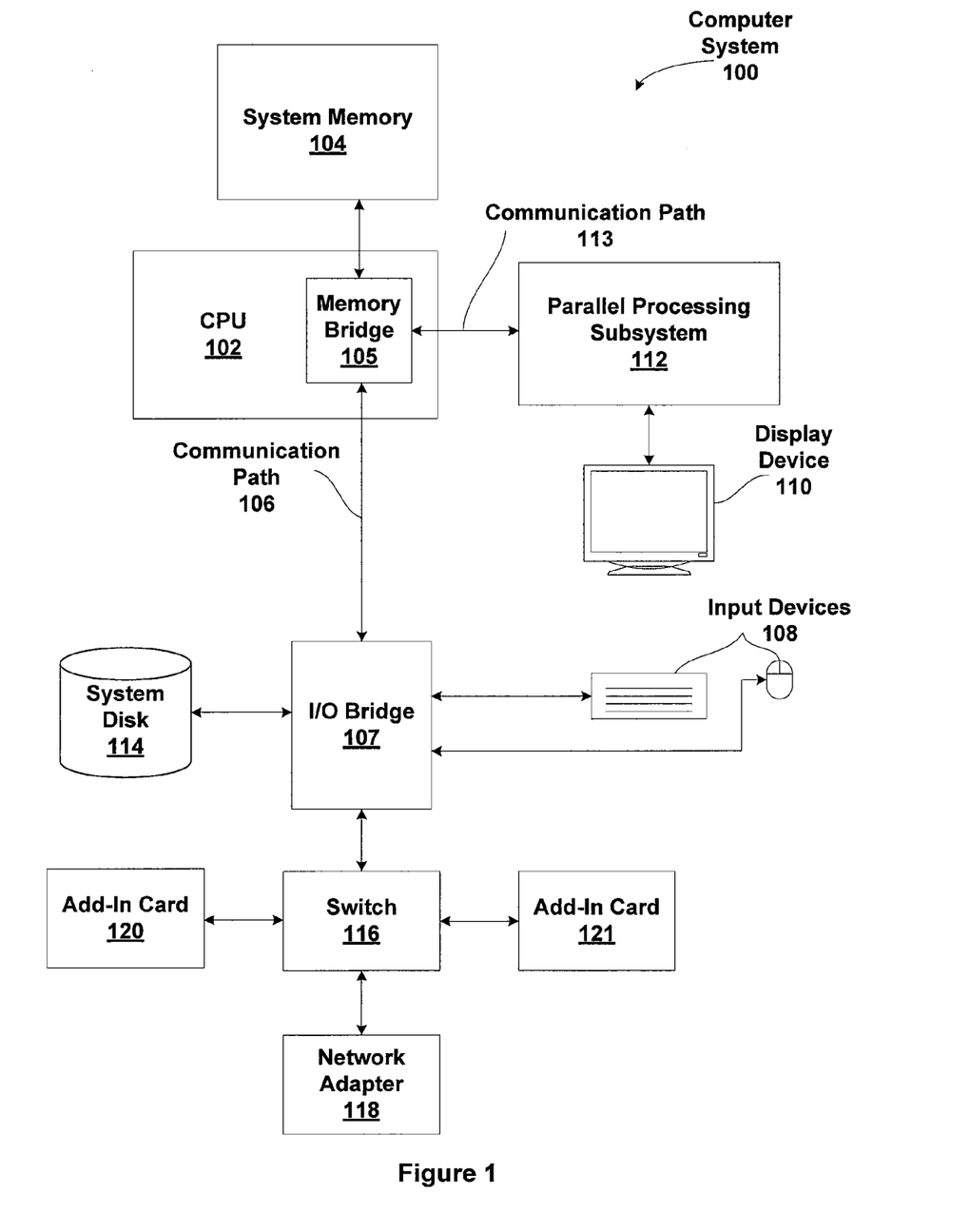
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes a central processing unit (CPU) 102 and a system memory 104 communicating via a bus path through a memory bridge 105. Memory bridge 105 may be integrated into CPU 102 as also shown, or alternatively, memory bridge 105, may be a conventional device, e.g., a Northbridge chip, that is connected via a bus to CPU 102. Memory bridge 105 is connected via communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105.

A parallel processing subsystem 112 is coupled to memory bridge 105 via a bus or other communication path 113 (e.g., a PCI Express, Accelerated Graphics Port, or HyperTransport link). In one embodiment parallel processing subsystem 112 is a graphics subsystem that delivers pixels to a display device 110 (e.g., a conventional CRT or LCD based monitor). The parallel processing subsystem 112 incorporates circuitry optimized for graphics and video processing, including, for example, video output circuitry, and constitutes a graphics processing unit (GPU). In one embodiment, the parallel processing subsystem 112 incorporates a scalable link interface (SLI) or hybrid SLI where multiple GPUs share the processing workload on the parallel processing subsystem. In another embodiment, the parallel processing subsystem 112 may be integrated with one or more other system elements, such as the memory bridge 105, CPU 102, and I/O bridge 107 to form a system on chip (SoC).

A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107.

Communication paths interconnecting the various components in FIG. 1 may be implemented using any suitable protocols, such as PCI (Peripheral Component Interconnect), PCI-Express (PCI-E), AGP (Accelerated Graphics Port), HyperTransport, or any other bus or point-to-point communication protocol(s), and connections between different devices may use different protocols as is known in the art.

It will be appreciated that the system shown herein is illustrative and that variations and modifications are possible. For example, the connection topology, including the number and arrangement of bridges, may be modified as desired. In some embodiments, system memory 104 is connected to CPU 102 directly rather than through a bridge, and other devices communicate with system memory 104 via memory bridge 105 and CPU 102. In other alternative embodiments, parallel processing subsystem 112 may be connected to I/O bridge 107 or directly to CPU 102, rather than to memory bridge 105. In still other embodiments, one or more of CPU 102, I/O bridge 107, parallel processing subsystem 112, and memory bridge 105 may be integrated into one or more chips. The particular components shown herein are optional. For instance, any number of add-in cards or peripheral devices may be supported. In other embodiments, switch 116 may be eliminated, and network adapter 118 and add-in cards 120, 121 may be connected directly to I/O bridge 107. In yet another embodiment, the parallel processing subsystem 112 may be accessed by the CPU 102 over a network and operations performed by the parallel processing subsystem 112 are performed remotely.

Figure 2:
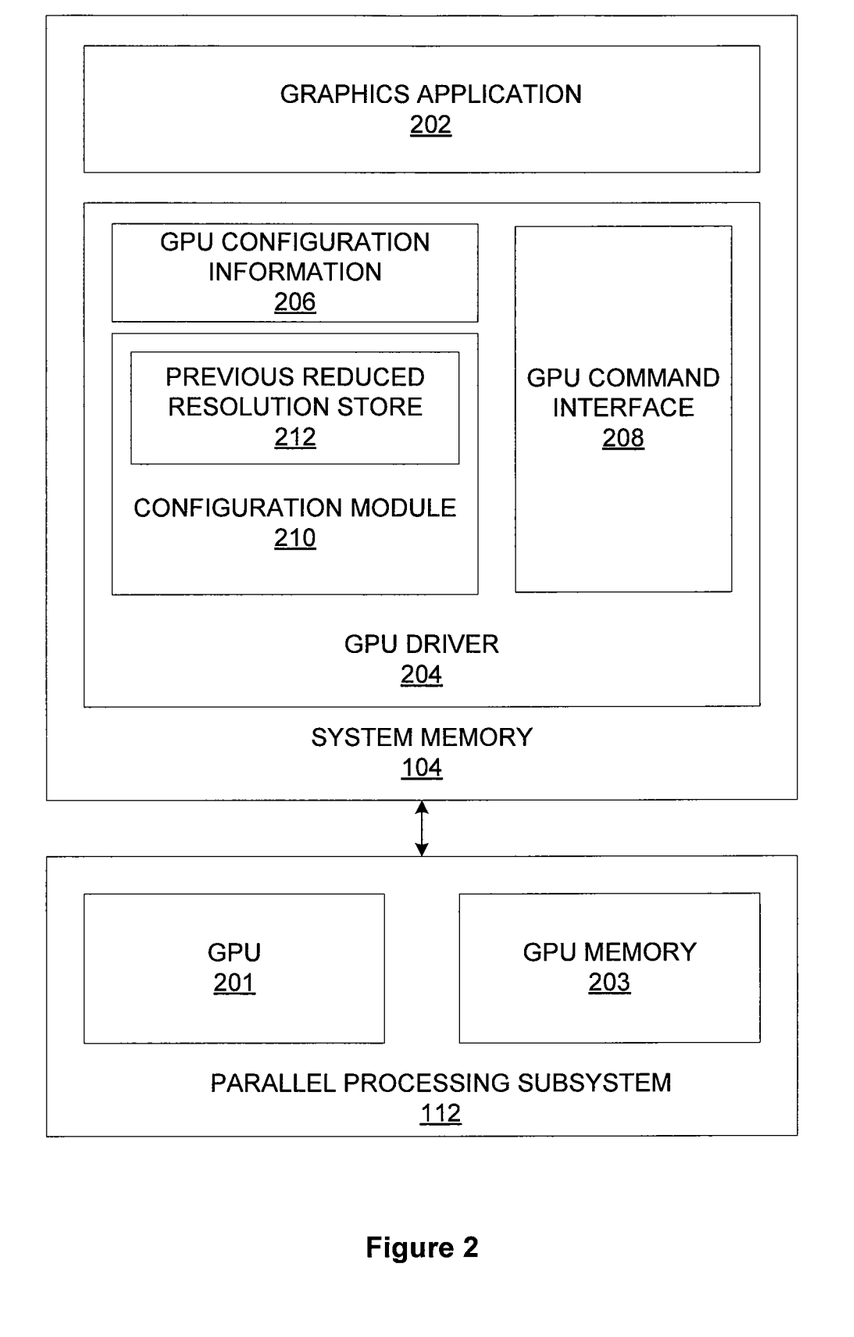
FIG. 2 is a more detailed view of the system memory and the parallel processing subsystem of FIG. 1, according to one embodiment of the present invention.

FIG. 2 is a more detailed view of the system memory 104 and the parallel processing subsystem 112 of FIG. 1, according to one embodiment of the present invention. As shown, the parallel processing subsystem 112 includes a GPU 201 and a GPU memory 203.

The GPU 201 is a graphics processor with a rendering pipeline that can be configured to perform various tasks related to rendering frames for display from graphics data supplied by the CPU 102 and/or the system memory 104. The GPU 201 interacts with the GPU memory 203 to store and update pixel data and rendered frames, delivers pixel data to display device 110, and the like. In some embodiments, the parallel processing subsystem 112 may include one or more GPUs 201 that operate as graphics processors and one or more other GPUs 201 that are used for general-purpose computations.

As also shown, the system memory 104 includes a graphics application 202 and a GPU driver 204. The graphics application 202 is a software program that, among other things, produces graphics data for rendering frames for display on the display device 110. For the rendering of a particular frame, the graphics application 202 transmits a graphics rendering command stream associated with the particular frame to the GPU driver 204. The graphics rendering command stream includes graphics data associated with the particular frame and a rendering command that specifies a nominal resolution at which the particular frame should be rendered. The nominal resolution specified by the rendering command relates to the display configuration of the display device 110.

The GPU driver 204 is as an interface layer between the GPU 201 and the graphics application 202. As shown, the GPU driver 204 includes GPU configuration information 206 and a GPU command interface 208. The GPU configuration information 206 stores configuration information associated with the GPU 201. The stored configuration information may be user-defined or may be pre-configured and, among other things, specifies whether the interleaving functionality for reduced frame rendering is active. As described in greater detail herein, the interleaving functionality for reduced frame rendering allows the GPU 201 to render consecutive frames at complementary reduced resolutions, thereby decreasing the computational load on the GPU 201.

As shown, the GPU driver 204 also includes a configuration module 210. The configuration module 210 configures the graphics rendering command streams received from the graphics application 202 to activate the interleaving functionality to implement reduced frame rendering. The configuration module 210 includes a previous reduced resolution store 212 that stores the reduced resolution associated with an immediately preceding graphics rendering command stream configured to implement reduced frame rendering.

In operation, when a graphics rendering command stream associated with a particular frame is received from the graphics application 202, the GPU command interface 208 first determines, based on configuration information stored in the GPU configuration information 206, whether the interleaving functionality to implement reduced frame rendering is active. If the interleaving functionality for reduced frame rendering is inactive, then the GPU command interface 208 transmits the graphics rendering command stream to the GPU 201 for conventional processing. If, however, the interleaving functionality for reduced frame rendering is active, then the GPU command interface 208 transmits a notification to the configuration module 210 that causes the configuration module 210 to configure the graphics rendering command stream to implement reduced frame rendering.

When configuring the graphics rendering command stream to implement reduced frame rendering, the configuration module 210 first determines the reduced resolution for the particular frame. A reduced resolution for a frame specifies a resolution that is typically less than the nominal resolution of the frame in a single dimension. For example, if the nominal resolution of the frame is 1280×1024 pixels, then the reduced resolution could be 640×1024 pixels, i.e. reduced by half in the X-dimension.

To determine the reduced resolution for the particular frame, the configuration module 210 first determines whether the previous reduced resolution store 212 indicates that the immediately preceding graphics rendering command stream is configured to implement reduced frame rendering. If not, then the reduced resolution for the particular frame is determined based on configuration information stored in the GPU configuration information 206. Specifically, the dimension in which the nominal resolution of the particular frame is reduced and the amount of resolution reduction is determined based on the GPU configuration information 206. For example, the GPU configuration information 206 may specify that the resolution reduction should happen in the X-Y dimension, and for a single frame, the resolution for one dimension (the X-dimension or the Y-dimension) should be reduced by half.

However, if the previous reduced resolution store 212 indicates that the immediately preceding graphics rendering command stream is configured to implement reduced frame rendering, then the reduced resolution for the particular frame is determined based on the reduced resolution associated with the immediately preceding graphics rendering command stream. Specifically, the reduced resolution for the particular frame is set to a reduced resolution that is complementary to the reduced resolution associated with the immediately preceding graphics rendering command stream. For instance, a complementary reduced resolution of a given resolution reduced by a specific amount in one dimension may be a resolution reduced by the specific amount in the opposite, i.e., complementary, dimension. For example, if the reduced resolution of the previous frame is 1280×512 pixels, i.e., reduced by half in the Y-dimension, then the complementary reduced resolution for the particular frame should be 640×1024 pixels, i.e. reduced by half in the X-dimension. In such a manner, two consecutive graphics rendering command streams are associated with complementary reduced resolutions when the interleaving functionality for reduced frame rendering is active.

Once the reduced resolution for the particular frame is determined, the configuration module 210 stores the reduced resolution in the previous reduced resolution store 212. The configuration module 210 then replaces the nominal resolution specified in the rendering command included in the graphics rendering command stream with the reduced resolution for the particular frame. The configuration module 210 also inserts an upscale command sequence including one or more upscaling commands, specifying the nominal resolution, into the graphics rendering command stream. The upscale command sequence, when processed by the GPU 201, causes the GPU to upscale the particular frame rendered at the reduced resolution to the nominal resolution. Persons skilled in the art would recognize that the upscale command sequence can specify any type of technically feasible upscaling technique including any type of interpolation technique. For example, if the particular frame is rendered at the reduced resolution of 640×1024 pixels, then the upscale command sequence specifying the nominal resolution of 1280×1024 causes the GPU 201 to "stretch" the rendered first frame to a display size reflective of the nominal resolution of 1280×1024 pixels. The configuration module 210 then notifies the GPU command interface 208 that the graphics rendering command stream is configured to implement reduced frame rendering. In response, the GPU command interface 208 transmits the configured graphics rendering command stream to the GPU 201 for further processing.

Persons skilled in that art would recognize that any type of data reduction across two or more frames, i.e., the complementary frames, falls within the scope of the present invention. For example, three complementary frames may be reduced in the color dimension, where a first complementary frame has reduced rendering for the color red, a second complementary frame has reduced rendering for the color green, and a third complementary frame has reduced rendering for the color blue. As another example, the complementary frames may be reduced along the diagonal, where a first complementary frame has reduced rendering along an upper-side of the diagonal and the second complementary frame has reduced rendering for the lower-side of the diagonal. As yet another example, the intermediary data used for rendering the complementary frames may be reduced. In such a scenario, texture data in texture maps, shadow data stored in shadow maps or data stored in any other map used for rendering the complementary frames may be reduced.

Persons skilled in the art also would recognize that complementary frames do not necessarily have to be consecutive frames. For example, any two frames in a series of three consecutive frames could be complementary frames.

Figure 3:
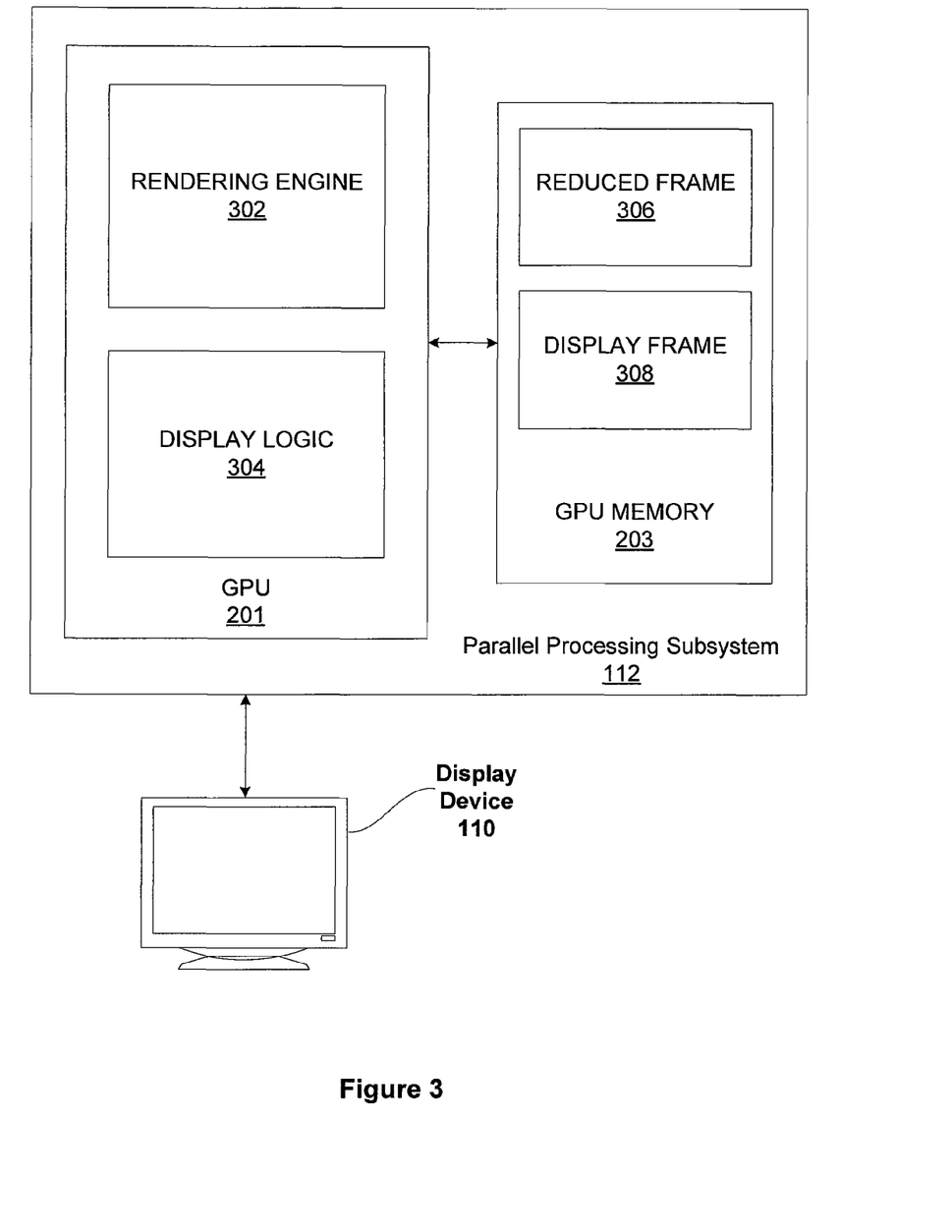
FIG. 3 is a more detailed view of the parallel processing subsystem of FIG. 1, according to one embodiment of the present invention.

FIG. 3 is a more detailed view of the parallel processing subsystem 112 of FIG. 1, according to one embodiment of the present invention. As shown, the GPU 201 includes a rendering engine 302 and display logic 304.

When the GPU 201 receives the configured graphics rendering command stream, a rendering engine 302 within the GPU 201 first processes the rendering command included in the configured graphics rendering command stream. As previously described, the rendering command included in the configured graphics rendering command stream specifies the reduced resolution at which the particular frame should be rendered. Based on the reduced resolution and the graphics data associated with the particular frame and included in the configured graphics rendering command stream, the rendering engine 302 processes the rendering command to produce the reduced resolution frame 306, i.e. the particular frame rendered at the reduced resolution. The reduced resolution frame 306 is stored in the GPU memory 203.

The rendering engine 302 then processes the upscale command sequence included in the configured graphics rendering command stream to produce a display frame 308. Again, the upscale command sequence specifies the nominal resolution of the particular frame. The upscale command sequence causes the rendering engine 302 to "stretch" the reduced resolution frame 306 rendered at the reduced resolution to a display size reflective of the nominal resolution specified in the upscale command sequence. The display frame 308 is also stored in the GPU memory 203. Once the display frame 308 is produced and stored in the GPU memory 203, the display frame 308 is transmitted to display logic 304 in the GPU 201. The display logic 304 transmits the display frame 308 to the display device 110 for display.

Importantly, a subsequent reduced resolution frame (herein referred to as the "complementary reduced resolution frame") rendered by the rendering engine 302 has a different reduced resolution that is complementary to the reduced resolution of the reduced resolution frame 306. The complementary reduced resolution frame is also upscaled to a display size reflective of the nominal resolution to produce a complementary display frame. The complementary display frame is then transmitted to the display device 110 via the display logic 304 for display subsequent to the display of the display frame 308.

Interleaving the display of the display frame 308 and the complementary display frame in such a manner appears to the human eye as a sequence of frames at a single high resolution. Advantageously, rendering complementary reduced resolution frames in conjunction with interleaving the display frames corresponding to the complementary reduced resolution frames lowers the computational load on the GPU 201 while maintaining the perceived image quality of the display.

Figure 4A:
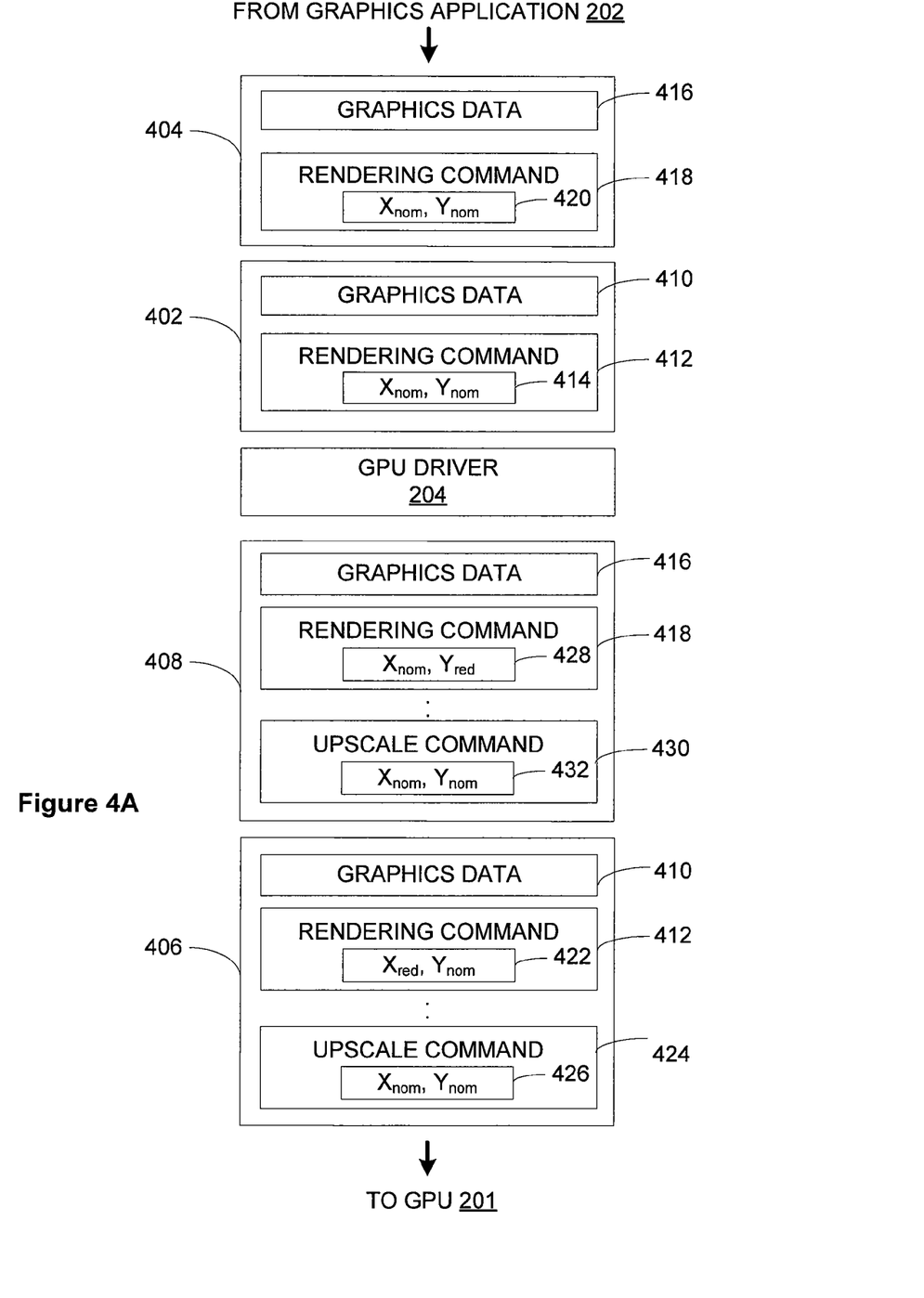
FIG. 4A is a diagram illustrating two graphics rendering command streams received from the graphics application of FIG. 2, and two configured graphics rendering command streams, according to one embodiment of the present invention.

FIG. 4A is a diagram illustrating two graphics rendering command streams 402 and 404 received from the graphics application 202 of FIG. 2, and two configured graphics rendering command streams 406 and 408 configured to implement reduced frame rendering, according to one embodiment of the present invention.

The graphics application 202 transmits a first graphics rendering command stream 402 associated with a first frame to the GPU command interface 208 within the GPU driver 204. The first graphics rendering command stream 402 includes graphics data 410 associated with the first frame and a rendering command 412. The rendering command 412 includes a nominal rendering resolution 414 specified by the graphics application 202 at which the first frame should be rendered.

As previously described herein, upon receiving the first graphics rendering command stream 402, the GPU command interface 208 transmits a notification to the configuration module 210 that causes the configuration module 210 to configure the first graphics rendering command stream 402 to produce the first configured graphics rendering command stream 406. The first configured graphics rendering command stream 406 includes the graphics data 410, the rendering command 412 and an upscale command sequence 424. A reduced rendering resolution 422 within the rendering command 412 in the configured graphics rendering command stream 406 specifies the reduced resolution for the first frame determined by the configuration module 210. The upscale command sequence 424, inserted by the configuration module 210, specifies a nominal rendering resolution 426 that matches the nominal rendering resolution 414 within the first graphics rendering command stream 402.

Subsequent to transmitting the first graphics rendering command stream 402, the graphics application 202 transmits a second graphics rendering command stream 404 associated with a second frame to the GPU command interface 208. The second graphics rendering command stream 404 includes graphics data 416 associated with the second frame and a rendering command 418. The rendering command 418 includes a nominal rendering resolution 420 specified by the graphics application 202 at which the second frame should be rendered.

As with the first graphics command stream 402, the configuration module 210 configures the second graphics rendering command stream 404 to produce the second configured graphics rendering command stream 408. The second configured graphics rendering command stream 408 includes the graphics data 416, the rendering command 418 and an upscale command sequence 430. A complementary reduced rendering resolution 428 within the rendering command 418 specifies the reduced resolution for the second frame determined by the configuration module 210 based on the reduced rendering resolution 422. The upscale command sequence 430, inserted by the configuration module 210, specifies a nominal rendering resolution 432 that matches the nominal rendering resolution 420 within the second graphics rendering command stream 404.

For the purpose of discussion only, suppose that the nominal rendering resolution 414 is $X_{nom}, Y_{nom}$ and the reduced rendering resolution 422 for the first frame is $X_{red}, Y_{nom}$, i.e., reduced in the X-dimension by a certain amount. The complementary reduced rendering resolution 428 for the second frame is then $X_{nom}, Y_{red}$, i.e., reduced in the Y-dimension by the certain amount. In such a manner, the first frame and the second frame are rendered at complementary reduced resolutions. Further, the nominal rendering resolution 426 included in the upscale command sequence 424 matches the nominal rendering resolution 414, and the nominal rendering resolution 432 matches the nominal rendering resolution 420. The complementary display frames generated by the GPU 201 when the upscale command sequence 424 and the upscale command sequence 430 are processed are then displayed on the display device 110 in an interleaved fashion giving an appearance of a sequence of frames rendered at the full resolution.

Figure 4B:
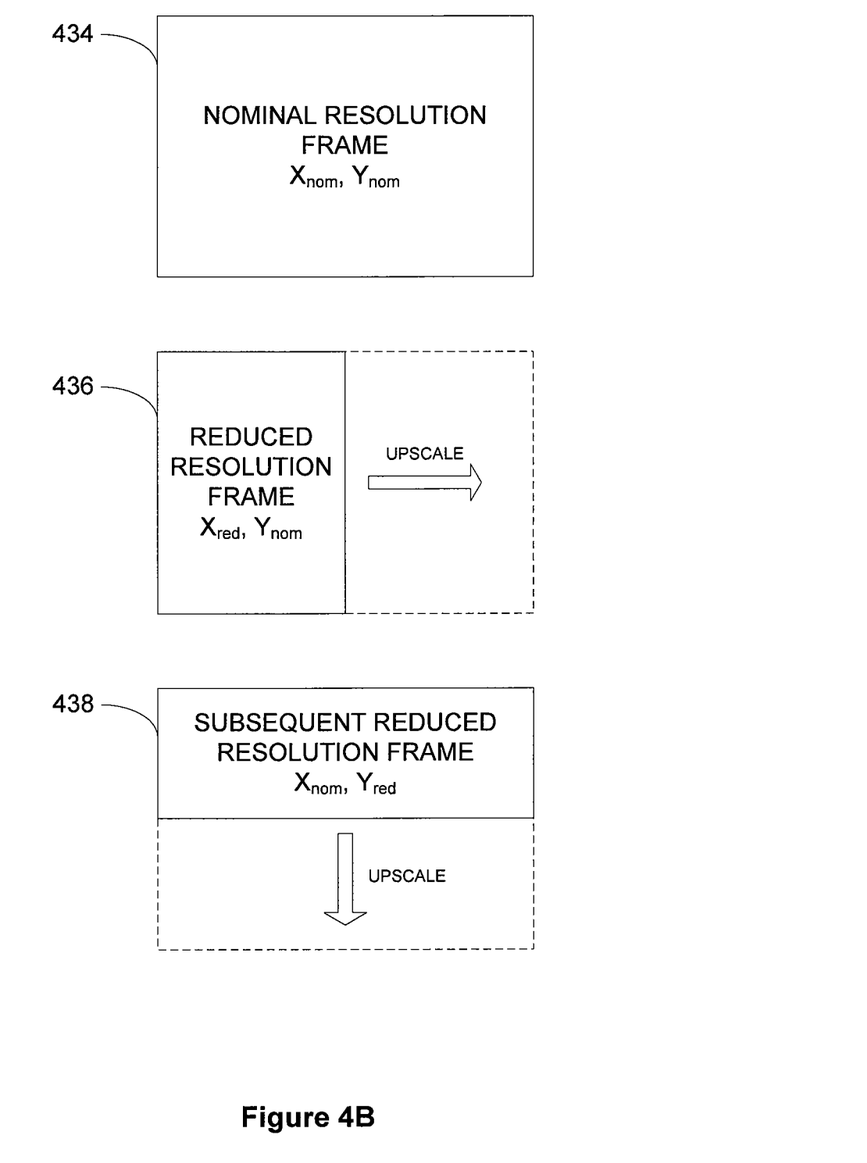
FIG. 4B is a diagram illustrating two reduced frames having complementary resolutions rendered by the GPU of FIG. 2 based on the configured graphics rendering command streams of FIG. 4A, according to one embodiment of the present invention.

FIG. 4B is a diagram illustrating two reduced frames having complementary resolutions rendered by the GPU 201 of FIG. 2 based on the configured command streams 406 and 408 of FIG. 4A, according to one embodiment of the present invention. As shown, display frame 434 has a nominal resolution specified by $X_{nom}, Y_{nom}$. When the interleaving functionality to implement reduced frame rendering is active, the first frame is rendered at a reduced resolution of $X_{red}, Y_{nom}$ and upscaled to $X_{nom}, Y_{nom}$. The display frame corresponding to the first frame is display frame 436. In such a scenario, the second frame is rendered at a complementary reduced resolution of $X_{nom}, Y_{red}$ and upscaled to $X_{nom}, Y_{nom}$. The display frame corresponding to the second frame is display frame 438.

Figure 5:
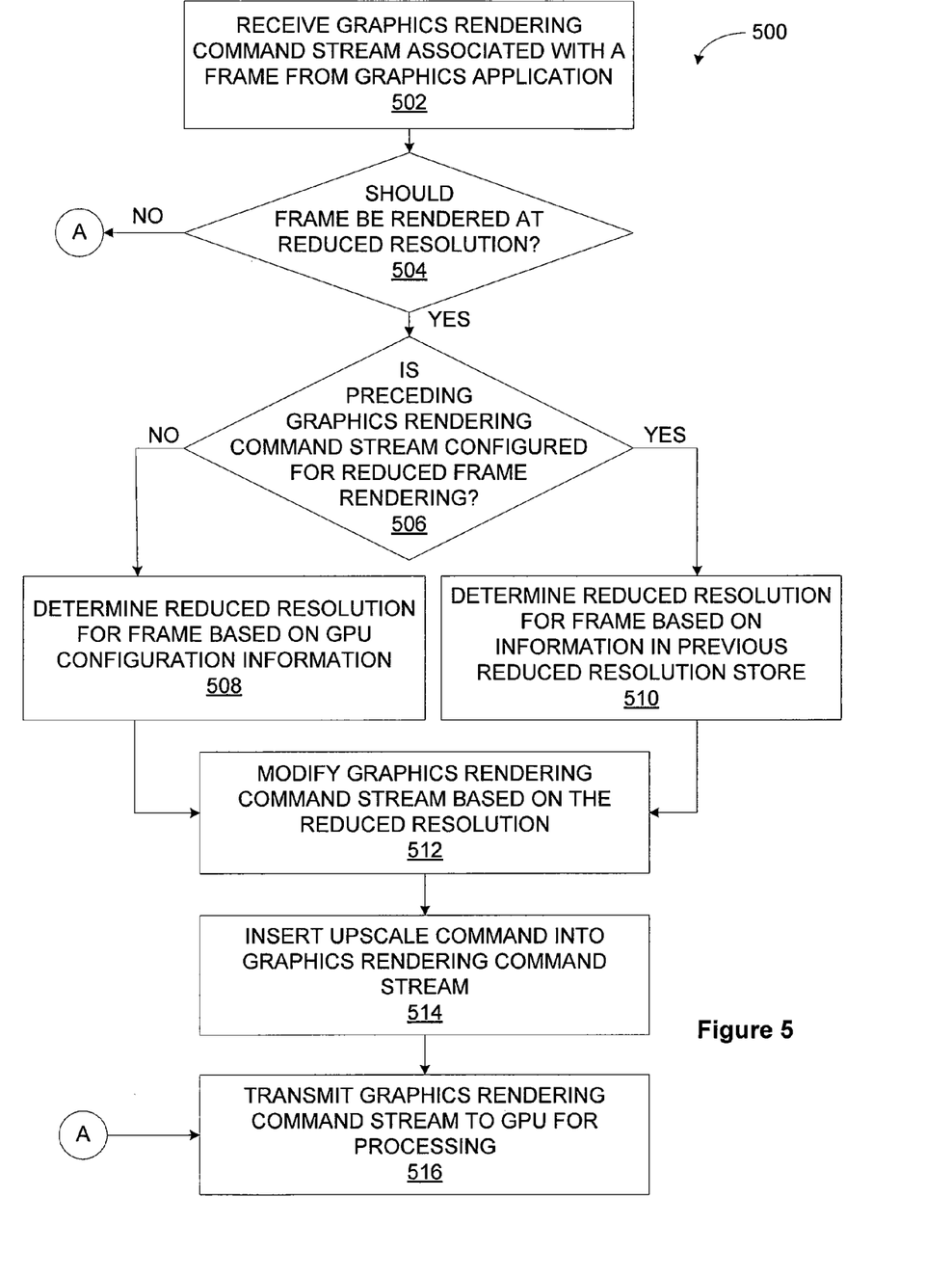
FIG. 5 is a flow diagram of method steps for configuring a graphics rendering command stream to activate the interleaving functionality to implement reduced frame rendering, according to one embodiment of the present invention.

FIG. 5 is a flow diagram of method steps for configuring a graphics rendering command stream to implement reduced frame rendering, according to one embodiment of the present invention. Although the method steps are described in conjunction with the systems for FIGS. 1-4, persons skilled in the art will understand that any system configured to perform the method steps, in any order, is within the scope of the invention.

The method 500 begins at step 502 where the GPU command interface 208 within the GPU driver 204 receives a graphics rendering command stream associated with a particular frame from the graphics application 202. The graphics rendering command stream includes a rendering command specifying a nominal resolution at which the particular frame should be rendered. At step 504, the GPU command interface 208 determines, based on configuration information stored in the GPU configuration information 206, whether the interleaving functionality to implement reduced frame rendering is active. If the interleaving functionality for reduced frame rendering is active, then the method 500 proceeds to step 506.

At step 506, the configuration module 210 begins configuring the graphics rendering command stream associated with the particular frame by determining whether the previous reduced resolution store 212 indicates that the immediately preceding graphics rendering command stream is configured to implement reduced frame rendering. If the immediately preceding graphics rendering command stream is not configured to implement reduced frame rendering, then the method 500 proceeds to step 508. At step 508, the configuration module 210 determines the reduced resolution for the particular frame based on configuration information stored in the GPU configuration information 206. Specifically, the dimension in which the nominal resolution of the particular frame is reduced and the amount of resolution reduction is determined based on the GPU configuration information 206.

If, however, at step 506, the configuration module 210 determines that the immediately preceding graphics rendering command stream is configured to implement reduced frame rendering, then the method 500 proceeds to step 510. At step 510, the configuration module 210 determines the reduced resolution for the particular frame based on the reduced resolution associated with the immediately preceding graphics rendering command stream. Specifically, the reduced resolution for the particular frame is set to a reduced resolution that is complementary to the reduced resolution associated with the immediately preceding graphics rendering command stream. A complementary reduced resolution of a given resolution reduced by a specific amount in one dimension is a resolution reduced by the specific amount in the opposite, i.e., complementary, dimension.

Once the reduced resolution for the particular frame is determined, the method 500 proceeds to step 512 where the configuration module 210 modifies the graphics rendering command stream by replacing the nominal resolution specified by the rendering command included in the graphics rendering command stream with the reduced resolution determined for the particular frame. At step 514, the configuration module 210 inserts an upscale command sequence, specifying the nominal resolution, into the graphics rendering command stream. The upscale command sequence, when processed by the GPU 201, causes the GPU 201 to "stretch" the particular frame rendered at the reduced resolution to a display size reflective of the nominal resolution. In such a manner, the graphics rendering command stream is configured to implement reduced frame rendering. At step 516, the GPU command interface 208 transmits the configured graphics rendering command stream to the GPU 201 for processing. In response, the GPU 201 renders the particular frame at the reduced resolution and upscales the reduced resolution frame to the nominal resolution to produce the display frame associated with the particular frame. The display frame is then transmitted to the display device 110 for display.

Returning now to step 504, if the interleaving functionality for reduced frame rendering is inactive, then the method 500 proceeds directly to step 516, where the GPU command interface 208 transmits the graphics rendering command stream to the GPU 201 for conventional processing.

In a different embodiment, the graphics application 202 transmits a graphics rendering command stream configured to implement reduced frame rendering to the GPU command interface 208. In such an embodiment, the graphics application 202 performs the configuration steps set forth above with respect to the configuration module 210, and the GPU command interface 208 simply transmits the graphics rendering command stream to the GPU 201.

In another embodiment, the GPU 201 configures the graphics rendering command stream received from the GPU command interface 208 to implement reduced frame rendering. In such an embodiment, the hardware within the GPU 201 performs the configuration steps set forth above with respect to the configuration module 210.

In yet another embodiment, the parallel processing subsystem 112 includes multiple GPUs that share the frame rendering workload. In such an embodiment, alternate (and complementary) frames may be rendered by different GPUs within the parallel processing subsystem 112.

In sum, the GPU driver receives a graphics rendering command stream from the graphics application for rendering a first frame at a nominal resolution. Based on the GPU configuration, the GPU driver determines whether the interleaving functionality for reduced frame rendering is active. If the interleaving functionality for reduced frame rendering is inactive, then the GPU driver transmits the graphics rendering command stream to the GPU for conventional processing. If, however, the interleaving functionality for reduced frame rendering is active, then the GPU driver configures the rendering command stream for the interleaving functionality for reduced frame rendering.

To configure the graphics rendering command stream for reduced frame rendering, the GPU driver first determines, based on the GPU configuration, the reduced resolution at which the first frame should be rendered. The reduced resolution is less than the nominal resolution in a single dimension. For example, if the nominal resolution is 1280×1024 pixels, then the reduced resolution for the first frame could be 640×1024 pixels, i.e. reduced by half in the X-dimension. Importantly, the graphics rendering command stream received from the graphics application for rendering a subsequent frame has a complementary reduced resolution. For example, if the reduced resolution of the first frame is 640×1024 pixels, then the complementary reduced resolution for the subsequent frame would be 1280×512 pixels, i.e. reduced by half in the Y-dimension.

Once the reduced resolution is determined for the first frame, the GPU driver modifies the resolution specified in the graphics rendering command stream, i.e., the nominal resolution, to specify the reduced resolution. The GPU driver then inserts an upscale command sequence into the graphics rendering command stream. The upscale command sequence, when executed by the GPU, causes the GPU to "stretch" the first frame rendered at the reduced resolution to a display size reflective of the nominal resolution. For example, if the particular frame is rendered at the reduced resolution of 640×1024 pixels, then the upscale command sequence causes the GPU to "stretch" the rendered first frame to a display size reflective of the nominal resolution of 1280×1024 pixels. The GPU driver then transmits the configured graphics rendering command stream to the GPU for processing. The GPU processes the graphics rendering command stream to produce a display frame generated from the first frame rendered at the reduced resolution. The display frame is then displayed on a display device.

Interleaving the display of the display frame and the complementary display frame in such a manner appears to the human eye as a single high-resolution frame. Therefore, rendering complementary reduced resolution frames in conjunction with interleaving the display frames corresponding to the complementary reduced resolution frames lowers the computational load on the GPU without diminishing the perceived quality of the display.

One advantage of the disclosed technique is that the GPU can render display images at high resolution and/or at high display frequency with a reduced computational load, without substantially impacting quality. This allows the GPU to render display images at much higher resolutions and display frequencies than previously possible. In addition, the reduced computational load of rendering allows the GPU to perform other graphical and numerical operations efficiently as well.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

Therefore, the scope of the present invention is determined by the claims that follow.

We claim:

1. A computer-implemented method for configuring a graphics rendering command stream to implement reduced frame rendering, the method comprising:
    receiving a first graphics rendering command stream associated with a first frame of graphics data;
    specifying a nominal resolution at which the first frame is to be rendered;
    determining a reduced resolution for the first frame based on configuration information associated with a graphics processing unit, the reduced resolution specifying a first reduced pixel count in a first screen direction and a first non-reduced pixel count in a second screen direction;
    indicating to the graphics processing unit that the first frame is to be rendered at the reduced resolution and then upscaled to the nominal resolution; and
    determining, based on the configuration information associated with a graphics processing unit, that an interleaving function for reduced frame rendering is active,
    wherein the first frame is adjacent in time to a second frame that is rendered at a second reduced resolution specifying a second non-reduced pixel count in the first screen direction and a second reduced pixel count in the second screen direction.

2. The method of claim 1, wherein indicating to the graphics processing unit comprises modifying the first rendering command within the first graphics rendering command stream to specify the reduced resolution instead of the nominal resolution, inserting a first upscale command sequence specifying the nominal resolution into the first graphics rendering command stream, and transmitting the first graphics rendering command stream, including the modified first rendering command and the first upscale command sequence, to the graphics processing unit for processing.

3. The method of claim 1, further comprising:
    receiving a second graphics rendering command stream associated with a second frame of graphics data from the graphics application and specifying the nominal resolution at which the second frame is to be rendered;
    determining a complementary reduced resolution for the second frame based on the reduced resolution determined for the first frame; and
    indicating to the graphics processing unit that the second frame is to be rendered at the complementary resolution and then upscaled to the nominal resolution.

4. The method of claim 3, wherein the reduced resolution is less than the nominal resolution in a first dimension.

5. The method of claim 4, wherein the complementary reduced resolution is less than the nominal resolution in a second dimension.

6. The method of claim 5, wherein the first dimension is an X-dimension, and the second dimension is a Y-dimension.

7. The method of claim 5, wherein the first dimension and the second dimension are specified in the configuration information associated with the graphics processing unit.

8. The method of claim 5, wherein the reduced resolution is less than the nominal resolution in the first dimension by a first amount, and the complementary reduced resolution is less than the reduced resolution in the second dimension also by the first amount.

9. The computer-implemented method of claim 1, further comprising indicating to the graphics processing unit that the second frame is to be rendered at the second reduced resolution and then upscaled to the nominal resolution.

10. A non-transitory computer-readable medium for storing instructions that, when executed by a processor, cause the processor to configure a graphics rendering command stream to implement reduced frame rendering by performing the steps of:
    receiving a first graphics rendering command stream associated with a first frame of graphics data;
    specifying a nominal resolution at which the first frame is to be rendered;
    determining a reduced resolution for the first frame based on configuration information associated with a graphics processing unit, the reduced resolution specifying a first reduced pixel count in a first screen direction and a first non-reduced pixel count in a second screen direction;
    indicating to the graphics processing unit that the first frame is to be rendered at the reduced resolution and then upscaled to the nominal resolution; and
    determining, based on the configuration information associated with a graphics processing unit, that an interleaving function for reduced frame rendering is active,
    wherein the first frame is adjacent in time to a second frame that is rendered at a second reduced resolution specifying a second non-reduced pixel count in the first screen direction and a second reduced pixel count in the second screen direction.

11. The computer-readable medium of claim 10, wherein indicating to the graphics processing unit comprises modifying the first rendering command within the first graphics rendering command stream to specify the reduced resolution instead of the nominal resolution, inserting a first upscale command sequence specifying the nominal resolution into the first graphics rendering command stream, and transmitting the first graphics rendering command stream, including the modified first rendering command and the first upscale command sequence, to the graphics processing unit for processing.

12. The computer-readable medium of claim 10, further comprising:
    receiving a second graphics rendering command stream associated with a second frame of graphics data from the graphics application and specifying the nominal resolution at which the second frame is to be rendered;
    determining a complementary reduced resolution for the second frame based on the reduced resolution determined for the first frame; and
    indicating to the graphics processing unit that the second frame is to be rendered at the complementary resolution and then upscaled to the nominal resolution.

13. The computer-readable medium of claim 12, wherein the reduced resolution is less than the nominal resolution in a first dimension.

14. The computer-readable medium of claim 13, wherein the complementary reduced resolution is less than the nominal resolution in a second dimension.

15. The computer-readable medium of claim 14, wherein the first dimension is an X-dimension, and the second dimension is a Y-dimension.

16. The computer-readable medium of claim 14, wherein the first dimension and the second dimension are specified in the configuration information associated with the graphics processing unit.

17. The computer-readable medium of claim 14, wherein the reduced resolution is less than the nominal resolution in the first dimension by a first amount, and the complementary reduced resolution is less than the reduced resolution in the second dimension also by the first amount.

18. A computer system, comprising:
a graphics processing unit (GPU); and
a memory storing a graphics application and a GPU driver, wherein the GPU driver includes configuration information and is configured to:
receive a first graphics rendering command stream associated with a first frame of graphics data,
specify a nominal resolution at which the first frame is to be rendered,
determine a reduced resolution for the first frame based on configuration information associated with a graphics processing unit, the reduced resolution specifying a first reduced pixel count in a first screen direction and a first non-reduced pixel count in a second screen direction,
indicate to the graphics processing unit that the first frame is to be rendered at the reduced resolution and then upscaled to the nominal resolution; and
determine, based on the configuration information associated with a graphics processing unit, that an interleaving function for reduced frame rendering is active,
wherein the first frame is adjacent in time to a second frame that is rendered at a second reduced resolution specifying a second non-reduced pixel count in the first screen direction and a second reduced pixel count in the second screen direction.

* * * * *